Patented Oct. 19, 1943

2,331,948

UNITED STATES PATENT OFFICE 2,331,948

METHOD FOR THE PURIFICATION OF LACTIC ACID

George E. Ward and Benjamin Tabenkin, Washington, Ill., assignors to Claude R. Wickard, as Secretary of Agriculture of the United States of America, and his successors in Office No Drawing. Application September 9, 1941, Serial No. 410,170

4 Claims. (Cl. 260—535)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to a method for the recovery of pure lactic acid from crude lactate-containing liquors, such as fermentation liquors, and to a method for the purification of impure lactic acid.

It is an object of our invention to obtain lactic acid of either the racemic or optically active form from impure racemic or optically active lactate-containing liquors in such a manner that any impurities such as coloring matters, nutrient salts, bacterial or fungal cells, or fermentation residues such as carbohydrate materials and proteinaceous materials will be separated from the lactic acid, yielding a water-white lactic acid of high purity. It is a further object of our invention to produce such purified lactic acid without the waste of chemical reactants so that the procedure will be economically advantageous.

The commercial purification of lactic acid has been a difficult problem, owing to the fact that this acid is not readily volatilized, does not form salts of extremely low solubility, and is somewhat difficultly converted to esters which might be used as purification intermediates. It is currently general commercial practice to effect purification by the repeated crystallization of calcium lactate from water, this salt being the form in which lactic acid is usually present in fermentation liquors. However, recrystallization of calcium lactate is troublesome and often unsatisfactory because the optically active and optically inactive forms of this salt, either of which may occur in present-day fermentation liquors, are quite soluble in water (about 5 gms. per 100 cc. of solution at room temperature) and are slow to crystallize, often forming super-saturated solutions; furthermore, upon crystallizing, these salts form spongy, retentive precipitates which, despite washing, hold many of the impurities present in the original crude liquors.

The desirability of using the zinc salt of racemic lactic acid as a means of separating this acid from concomitant impurities has been previously recognized. This salt is less soluble in the cold than most other salts of racemic lactic acid and, in contrast to the calcium salt, forms hard granular crystals which do not retain excessive quantities of impurities commonly encountered in crude lactate liquors. The solubility of zinc racemic lactate in water is about 1.5 grams per 100 cc. of solution at room temperature and about 16 grams per 100 cc. at 100° C.; this difference in solubility permits its easy purification by recrystallization from water.

The advantage of using zinc lactate as a means of purifying lactic acid was recognized by Waite (U. S. Patent 455,078 (1891)), who converted the calcium lactate of fermentation liquors to the zinc salt to separate the lactic acid from impurities, then reconverted to the calcium salt by adding milk of lime which precipitated the zinc as the oxide. Free lactic acid was then obtained from the calcium salt by the usual reaction with sulfuric acid. The obvious disadvantage of this process is the cost of supplying the milk of lime and the loss of zinc oxide which is not suitable for further use in the process.

It has also been proposed to convert fermentation lactic acid to its zinc salt and to regenerate the lactic acid therefrom by means of hydrogen sulfide (Ullmann, "Enzyklopädie der technischen Chemie," 2 Auflage, vol. 7, p. 590); this procedure has the disadvantages that the reaction of zinc lactate with hydrogen sulfide is not quantitative and a great excess of the expensive and toxic hydrogen sulfide must be used; furthermore, the resulting zinc sulfide is of no further use in the purification operations and represents an economic loss.

It has also been proposed to react purified zinc lactate with barium sulfide (Braun, U. S. Patent 2,024,565 (1935)), whereupon zinc sulfide is precipitated and separated from the mass, the solution containing barium lactate then being treated with sulfuric acid to yield lactic acid as the only soluble constituent. This procedure is costly, since zinc sulfide and barium sulfate are constantly lost and barium sulfide must be constantly added to the operations.

To the best of our knowledge, none of these lactic acid purification processes involving the use of zinc lactate are in commercial use today because of their un-economical nature.

In contrast to what might ordinarily be expected from the known solubilities of zinc sulfate and of zinc lactate (both racemic and optically active forms) we have found that under properly chosen conditions it is possible to treat zinc lactate or its aqueous solutions with sulfuric acid, thereby converting substantially all of the zinc to zinc sulfate, which we have found to be substantially insoluble in the reaction mass, leaving in solution substantially pure lactic acid.

When the reaction is conducted under the conditions set forth below there is no decomposition of the lactic acid, and a colorless, high-grade product is obtained. The solubility of zinc racemic lactate in water at room temperature is approximately 1.5 grams per 100 cc. of solution, while the solubility of zinc sulfate ($ZnSO_4 \cdot 7H_2O$) at room temperature is in excess of 100 grams per 100 cc. of solution. Similarly, the solubility of either of the optically active salts, zinc d-lactate or zinc l-lactate, is approximately 5 grams per 100 cc. at room temperature (Pedersen, Peterson and Fred, J. Biol. Chem., vol. 68, pages 151–163 (1926)). Accordingly it might be expected that in an aqueous system containing the zinc, lactate, and sulfate components, crystallization of zinc lactate (either active or inactive salt) would occur long before any crystallization of zinc sulfate could be obtained. However, we have discovered that under prescribed conditions the zinc sulfate, rather than the zinc lactate, crystallizes from the reaction mass, leaving in the supernatant liquor substantially pure lactic acid. The application of this discovery has enabled us to develop a method for the recovery of lactic acid from crude lactate liquors such as fermentation liquors containing calcium lactate and for the purification of any impure grades of lactic acid, our method differing from all previous procedures in that we react a previously purified zinc lactate (either optically active or inactive form) directly with sulfuric acid, remove the precipitated zinc sulfate, and recover the substantially pure lactic acid.

A novel and important feature of our method is that the zinc sulfate resulting from the reaction of zinc lactate with sulfuric acid can be utilized directly in the treatment of fresh fermentation liquors or crude lactate liquors containing calcium lactate whereby the undesired calcium sulfate is separated and the desired crystalline zinc lactate is obtained. This procedure results in a cyclic process in which, except for small losses, the zinc used in the initial treatment of the crude lactate liquor is made available for the indefinite continuation of purification operations, the only new reactant added to the process being sulfuric acid such as has been usually added in the past to liberate the lactic acid from calcium lactate. Similarly, the only by-product from our process is calcium sulfate, such as is obtained at present. From an economic viewpoint therefore, our method is advantageous because we are able to obtain pure lactic acid without the ultimate use of any appreciable quantities of chemical reactants beyond those in present use for the direct conversions of calcium lactate to calcium sulfate and lactic acid.

During the course of perfecting our invention we have found that the optically active zinc lactates are much more soluble in hot water than zinc racemic lactate, the solubility of the former being in the neighborhood of 22 to 25 grams of salt per liter of solution. This circumstance, coupled with the moderate solubility of the optically active zinc lactates at room temperatures and slightly below room temperatures, is very favorable for the purification of these salts by recrystallization from hot aqueous solutions. We have found that purification can be readily attained by preparing a saturated or near-saturated solution of optically active zinc lactate in hot water (70° to 110° C.), preferably at the boiling temperature of the aqueous solution, by then treating the solution with a small quantity of activated char and filtering, and by then allowing the filtered solution to cool, whereupon there is formed a precipitate of pure optically active zinc lactate which can be readily separated by filtration, centrifugation, or subsidence. We have found that this heat treatment causes no racemization of the optically active zinc lactate.

We have found that when the reaction between zinc lactate and sulfuric acid is conducted under the conditions set forth in this specification, entirely analogous results are obtained with zinc racemic lactate and the optically active zinc lactates. For the purposes of this invention, therefore, we define the term "zinc lactate" to mean any of the three forms of this salt; that is, either zinc racemic lactate, zinc d-lactate, or zinc l-lactate.

We have found that the successful utilization of the chemical reaction between zinc lactate and sulfuric acid is dependent upon the concentration of sulfuric acid employed and upon the temperatures at which the reaction mixture is held during the course of the reaction between zinc lactate and sulfuric acid and during the subsequent crystallization of the resulting zinc sulfate. If quite dilute solutions of sulfuric acid are employed, for example less than 6 Normal, little or no zinc sulfate can be separated from the mass, and if excessively high concentrations of sulfuric acid are used, for example above 18 Normal, the zinc sulfate separates from the mass in the form of extremely fine crystals which quickly form a very hard cake, a circumstance which adds greatly to the difficulty of filtering. We have found the range 10 to 15 Normal to be especially suitable for the sulfuric acid concentration since at these concentrations, upon cooling, the zinc sulfate is precipitated substantially quantitatively in a readily filterable condition.

We have found that the reaction between zinc lactate and sulfuric acid may be carried out within the temperature range of 35° to 80° C. Above 60° C. colored supernatant liquors are sometimes obtained, indicating decomposition of the lactic acid, while below 50° C. zinc lactate is not readily soluble in the acid and will not readily react. We find the range 50° to 60° C. to be especially suitable for the reaction since within this temperature range the zinc lactate and sulfuric acid react quickly and completely without decomposition. Following the reacting of zinc lactate and sulfuric acid we cool the mass to room temperature (below 25° C.) or, preferably, to a somewhat lower temperature (0° to 10° C.) whereupon substantially all the zinc sulfate crystallizes and can be separated by conventional means such as filtration, subsidence, or centrifugation and, if so desired, can be re-used as a precipitating agent for the preparation of more zinc lactate from crude lactate liquors. The lactic acid, which is substantially the only solute present in the liquor remaining after the separation of zinc sulfate, is sufficiently pure for many purposes since it is entirely free from organic impurities and is associated with not more than a trace of zinc or sulfate ions. If necessary, a more highly purified lactic acid can be obtained from this product by known methods such as distillation, precipitation, or extraction, and in such cases it will be found that these additional purification steps can be very easily and economically conducted because of the relatively high purity of the lactic acid resulting from the sulphuric acid treatment. Thus, distillation may be performed directly on the purified lactic acid solution, first water and then pure lactic acid being separated from the small quantity of inorganic ions present. Should we desire to effect a purification by means of organic solvents capable of dissolving lactic acid, such as ethyl ether, isopropyl ether, selected nitroparaffins and the like, we have found it possible to contact the purified lactic acid with a relatively small quantity of such solvents and to then effect a separation of the mass into two phases, one rich in solvent and lactic acid, the other containing all the inorganic impurities. We separate the former phase and distill or evaporate the organic solvent therefrom, thereby obtaining pure lactic acid.

It is also possible to remove the traces of zinc and sulfate ions from our purified lactic acid by treating with barium hydroxide or barium lactate to effect precipitation of the sulfate and by treating with a ferrocyanide to effect precipitation of the zinc. Likewise, it is possible to remove small quantities of these impurities by the addition of barium sulfide in a quantity chemically equivalent to the concentration of zinc and sulfate ions, which, incidentally, are always present in chemically equivalent quantities when the zinc lactate has reacted completely with the sulfuric acid. By means of the barium sulfide, zinc is removed as zinc sulfide, and sulfate is removed as barium sulfate, leaving in aqueous solution only the pure lactic acid.

We have found that the zinc lactate should be contacted with the chemically equivalent quantity of sulfuric acid to secure the best results. If a quantity of sulfuric acid in excess of the chemically equivalent quantity be used, the recovered lactic acid will be associated with the excess of sulfuric acid, whereas if a deficiency of sulfuric acid be used the yield of lactic acid will be low without there being an appreciable decrease in the amount of zinc or sulfate ions remaining in solution with the lactic acid.

Although it is possible to combine zinc lactate solutions with sulfuric acid solutions of such concentrations as to yield mixtures whose acid strength lies within the desired range, we find it more convenient in practical operations to add to a warm sulfuric acid solution of prescribed strength a chemically equivalent quantity of zinc lactate as a dry powder or in the form of damp crystals such as have just previously been separated from a crystallization operation. However, a desirable alternative procedure comprises the mixing of zinc lactate with a prescribed quantity of water to form a slurry, and adding to this slurry a prescribed quantity of cold concentrated sulfuric acid, the quantities of water and acid and the rate of addition of the acid being so selected and so controlled that the heats of dilution and reaction will bring the mass to the temperature at which it is desired to conduct the reaction, namely 35° to 80° C. We wish to emphasize, however, that the exact order or manner in which the zinc lactate and sulfuric acid are brought into contact is not critical or determinative.

Although we have emphasized the use of zinc sulfate in obtaining zinc lactate from crude lactate-containing liquors, we do not wish our invention to be restricted to the use of this salt, since under some conditions we find it desirable to use other means of forming zinc lactate; thus, some crude liquors contain free lactic acid, in which case we prefer to form the desired zinc lactate by contacting the crude liquors with zinc oxide or zinc carbonate.

As illustrative of the manner in which our invention may be practiced we give the following example, although the exact details presented are to be considered in no way restrictive. We may take as a crude lactate-containing material a light brown colored fermentation liquor resulting from the fermentation of glucose and containing by analysis 9.0 grams of d-lactic acid per 100 cc., present as the calcium salt, in addition to small quantities of residual sugar, fungus cells, minor nutrients and fermentation by-products. To one liter of this liquor we may add 143.8 grams of zinc sulfate ($ZnSO_4 \cdot 7H_2O$), a quantity chemically equivalent to the lactic acid present. We may then warm the mass to assist in the precipitation of calcium sulfate and after this precipitate has formed we may separate it by filtration. We may then concentrate the filtrate until the major portion of the zinc d-lactate has crystallized, after which we may separate these crystals by filtration. We may now continue the concentration of the mother liquor to obtain a second crop of crystalline zinc d-lactate which is separated in the same manner and we may, in a similar way, obtain still a third crop of zinc d-lactate. We may now recrystallize the combined crops of zinc d-lactate from approximately four times their weight of boiling water, obtaining 110.0 grams of white crystalline zinc d-lactate, $Zn(C_3H_5O_3)_2 \cdot 2H_2O$, which is entirely free from residual sugar, fungus cells, and other organic impurities. We may now bring 65.8 cc. of 12 Normal sulfuric acid (this quantity being the exact chemical equivalent of the 110.0 grams of pure zinc d-lactate) to a temperature of 55° C. and we may add thereto the 110.0 grams of pure zinc d-lactate, stirring the mixture thoroughly for several minutes. We may now set the mixture in the refrigerator over night and the next day we may filter off the heavy supernatant liquor through a Buchner funnel, removing as much of the liquor from the crystalline material as possible. The filtrate is a water-clear solution containing 68.0 grams of d-lactic acid and only traces of zinc and sulfate ions. On the other hand, the precipitate consists of 110.0 grams of zinc sulfate and only a small quantity of lactic acid. We may now use this crystalline zinc sulfate to prepare new lots of zinc d-lactate from fresh fermentation liquors according to the procedure indicated above, and we may carry the zinc d-lactate thus obtained through the above outlined operations.

Having thus described our invention, what we claim for Letters Patent is:

1. A method for obtaining racemic lactic acid from zinc racemic lactate which comprises adding the zinc racemic lactate to a chemically equivalent quantity of 6 Normal to 18 Normal sulfuric acid; maintaining the temperature of the mass at 35° to 80° C. until the sulfuric acid and zinc racemic lactate have reacted; cooling the mass to 0° to 25° C., and physically separating the precipitated zinc sulfate, thereby obtaining racemic lactic acid.

2. A method for obtaining optically active lactic acid from optically active zinc lactate which comprises adding the optically active zinc lactate to a chemically equivalent quantity of 6 Normal to 18 Normal sulfuric acid; maintaining the temperature of the mass at 35° to 80° C. until the sulfuric acid and optically active zinc lactate have reacted; cooling the mass to 0° to 25° C., and physically separating the precipitated zinc sulfate, thereby obtaining optically active lactic acid.

3. A method for obtaining racemic lactic acid from zinc racemic lactate which comprises mixing the zinc racemic lactate with sufficient water to form a slurry; adding thereto a quantity of concentrated sulfuric acid which is chemically equivalent to the zinc racemic lactate at such a rate that the temperature of the mass reaches 35° to 80° C., the while agitating the mass until the reaction is complete; cooling the mass to 0° to 25° C.; and physically separating the precipitated zinc sulfate, thereby obtaining racemic lactic acid.

4. A method for obtaining d-lactic acid from zinc d-lactate which comprises mixing the zinc d-lactate with sufficient water to form a slurry; adding thereto a quantity of concentrated sulfuric acid which is chemically equivalent to the zinc d-lactate at such a rate that the temperature of the mass reaches 35° to 80° C., the while agitating the mass until the reaction is complete; cooling the mass to 0° to 25° C.; and physically separating the precipitated zinc sulfate, thereby obtaining d-lactic acid.

GEORGE E. WARD.
BENJAMIN TABENKIN.